(12) United States Patent
McGrady

(10) Patent No.: US 8,420,047 B2
(45) Date of Patent: *Apr. 16, 2013

(54) HYDROGENATION OF ALUMINUM USING A SUPERCRITICAL FLUID MEDIUM

(76) Inventor: Gerard Sean McGrady, Lincoln (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/053,117

(22) Filed: Mar. 21, 2011

(65) Prior Publication Data

US 2011/0178312 A1 Jul. 21, 2011

Related U.S. Application Data

(63) Continuation of application No. 11/951,588, filed on Dec. 6, 2007, now Pat. No. 7,931,887.

(60) Provisional application No. 60/873,105, filed on Dec. 6, 2006.

(51) Int. Cl.
*C01F 7/02* (2006.01)
*C01B 3/24* (2006.01)

(52) U.S. Cl.
USPC .......................................... 423/625; 423/650

(58) Field of Classification Search ................... 423/625
See application file for complete search history.

(56) References Cited

U.S. PATENT DOCUMENTS

| | | | |
|---|---|---|---|
| 6,228,338 | B1 | 5/2001 | Petrie et al. |
| 6,536,485 | B1 | 3/2003 | O'Brien |
| 6,733,725 | B2 | 5/2004 | Zaluska et al. |
| 7,931,887 | B2 | 4/2011 | McGrady |

FOREIGN PATENT DOCUMENTS

WO 20061063456 A1 6/2006

OTHER PUBLICATIONS

J.B. Milstein and L.F. Saunders, "Gettering of Gases for High Purity Applications," J. Crystal Growth 89, 124 (1988).
"The Direct Synthesis of Amine Alanes" E.C. Ashby, Journal of the American Chemical Society, 1964, vol. 86, p. 1882.
International Search Report and Written Opinion, Mar. 16, 2009, 11 pages.
Jenson et al. Investigation of the Direct Hydrogenation of Aluminum to Alane in Supercritical Fluids'. In 2007 APS March Meeting, Mar. 6, 2007, Denver, Colorado, USA. Accessed on Mar. 4, 2009 <URL:http//ftux.aps.org/meetingsIYR07/MAR07/all MAR07.pdt>.
McGrady et al. Towards the Direct Synthesis of Alane: Hydrogenations Studies of Aluminum in Supercritical Auld Media:. In: International Symposium on Materials Issues in a Hydrogen Economy, SCientific Program and Abstract Book, Nov. 12-15, 2007, Richmond, Virginia, USA, p. W-18. Accessed on Mar. 4, 2009 <URL:http//www.has.vcu.edu/phyllshe/AbstractBooks.pdt>.

*Primary Examiner* — Melvin C Mayes
*Assistant Examiner* — Kenneth Vaden
(74) *Attorney, Agent, or Firm* — Milstein Zhang & Wu LLC; Joseph B. Milstein

(57) ABSTRACT

An apparatus and a method for controllably converting aluminum into alane. In the system of the invention, a reaction between aluminum and hydrogen to form alane is performed at temperatures below 100° C. using a supercritical fluid such as $CO_2$ as a reaction medium, with the optional inclusion of a co-solvent, such as an ether, in the reaction vessel. Inert gas is used to exclude unwanted gases such as oxygen. The reaction of aluminum and hydrogen has been observed to proceed at approximately 60° C. using $Me_2O$ as an added solvent in $CO_2$ at supercritical pressures.

11 Claims, 6 Drawing Sheets

_US 8,420,047 B2_

HYDROGENATION OF ALUMINUM USING A SUPERCRITICAL FLUID MEDIUM

CROSS-REFERENCE TO RELATED APPLICATIONS

Application Ser. No. 13/053,117 is a continuation of and claims priority and the benefit of U.S. patent application Ser. No. 11/951,588, filed Dec. 6, 2007, issued as U.S. Pat. No. 7,931,887 on May 31, 2011, which application claimed the priority to and benefit of U.S. provisional patent application Ser. No. 60/873,105, filed Dec. 6, 2006, which application is incorporated herein by reference.

FIELD OF THE INVENTION

The invention relates to hydrogenation in general and particularly to a system and method that employs a supercritical fluid medium to hydrogenate a metal.

BACKGROUND OF THE INVENTION

Hydrogen storage materials or media (HSMs) are a class of chemicals containing hydrogen in a chemically or physically bound form. They have wide potential utility in the areas of transportation, materials manufacture and processing and laboratory research. There is particular current interest in HSMs for the first application: vehicles powered by fuel cells or internal combustion engines for use in a 'hydrogen economy' will require an on-board source of hydrogen fuel, and hydrogen is very difficult to store either as a gas or as a cooled liquid to provide sufficient distance between refills.

Despite optimism over the last three decades, a hydrogen economy remains a utopian vision. The US Department of Energy (DOE) Basic Science group published a landscape report in 2003 summarizing the fundamental scientific challenges that must be met before a hydrogen economy becomes viable. The report identifies the following desiderata for a viable HSM:
1. High hydrogen storage capacity (min 6.5 wt % H).
2. Low $H_2$ generation temperature ($T_{dec}$ ideally around 60-120° C.).
3. Favorable kinetics for $H_2$ adsorption/desorption.
4. Low cost.
5. Low toxicity and low hazards.

Alane, $(AlH_3)_x$ is a polymeric network solid that contains 10.1 wt % hydrogen and undergoes dehydrogenation to simple, nontoxic Al powder. It is an excellent candidate material to meet the long term DOE hydrogen systems goals. Since the time of filing of our earlier patent application entitled SYNTHESIS, RECHARGING AND PROCESSING OF HYDROGEN STORAGE MATERIALS USING SUPERCRITICAL FLUIDS (International Pat. App. PCT/CA2005/001908), alane has become a serious contender as an HSM for vehicular hydrogen storage. However, the enthalpy of dehydrogenation of all known phases of alane indicate that direct rehydrogenation can be accomplished only at extremely high pressures, and is therefore not viable as a large-scale technology. Thus the utilization of alane as a practically viable hydrogen storage material can only be realized if alternative methods can developed for the hydrogenation of aluminum. Currently, there are no methods known to achieve this outcome, aside from the laborious, costly and wasteful route involving conversion of Al into a corresponding halide or other derivative, followed by a metathesis reaction with a saline or complex hydride, as detailed in Equations 1 and 2.

Al+3LiCl+1.5H$_2$→AlCl$_3$+3LiH (uptake of H$_2$)  Eq. 1

AlCl$_3$+3LiH→Al+3LiCl+1.5H$_2$ (release of H$_2$)  Eq. 2

These reactions can be applied in a cycle, as illustrated in Scheme 1. It is believed that the hydrogen uptake reaction given by Equation 1 converts the Al+3LiCl to AlCl$_3$+3LiH by way of the intermediates Al+Cl$_2$+3Li+H$_2$ as shown on the left hand side of the cycle. It is further believed that the hydrogen release reaction given by Equation 2 converts the AlCl$_3$+3LiH to Al+3LiCl by way of the intermediates AlH$_3$+3LiCl as shown on the right hand side of the cycle.

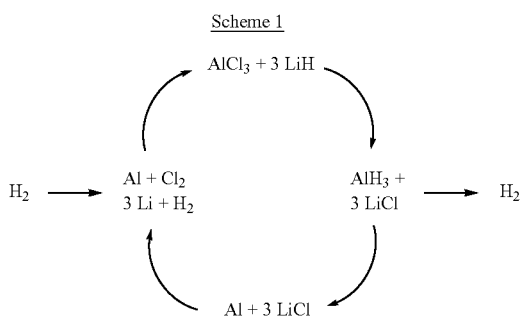

Scheme 1

Reports describing the use of alane as a chemical reagent appear in the public literature at least as early as 1947. U.S. Pat. No. 6,228,388 issued May 8, 2001 to Petrie et al. describes various methods of preparing alane using metal hydrides as a source of hydrogen.

U.S. Pat. No. 6,536,485 issued Mar. 25, 2003 to O'Brien discloses a means of room temperature packaging of hydrogen using a solvent such as ethane or hexane: large amounts of H$_2$ gas can be dissolved in these hydrocarbons when they are in a supercritical phase. O'Brien exploits the high miscibility of hydrogen with supercritical fluids, effectively using the organic solvent as an HSM. At column 7, lines 41-42 the patent teaches that by using the systems and methods disclosed therein, "The high weight of metal hydride type storing systems is also avoided." This statement appears to be teaching away from using metal hydrides for the storage of hydrogen.

SUMMARY OF THE INVENTION

In one aspect, the invention relates to an apparatus for the conversion of aluminum to alane. The apparatus comprises a pressure vessel configured to contain a quantity of aluminum powder or alane. The apparatus comprises sources of solvents (such as Me$_2$O, Et$_2$O and THF), gases or liquids (or more generally, fluids) capable of attaining a supercritical state (such as CO$_2$), and a source of hydrogen (such as gaseous H$_2$) in fluid communication with the pressure vessel. As needed, the apparatus comprises a source of inert gas, which can be useful in excluding or removing room air from the pressure vessel and other components of the reaction apparatus, so as to reduce the concentration of reactive gases such as oxygen and water vapor found therein to acceptably low levels. The apparatus comprises one or more pumps as needed to raise the pressure of fluids admitted into the pressure vessel to desired pressures. The apparatus comprises a heat source for heating the pressure vessel to a desired operating temperature and a cooler for cooling the pressure vessel to a desired temperature. The apparatus comprises a stirrer for stirring the reaction medium. The apparatus comprises a controller configured to control at least one of a fluid flow, a temperature and a pressure with the apparatus to fall within a respective one of a desired flow rate and direction, a desired temperature, and a desired pressure. In some embodiments, the aluminum contains (or is doped with) a dopant, such as titanium. In one embodiment, the controller is configured to control at least one of a fluid flow, a temperature and a pressure within the apparatus is a general purpose programmable computer-based controller.

In another aspect, the invention relates to a method of generating alane. The method comprises the steps of providing a pressure vessel; providing a controller configured to control at least one of a fluid flow, a temperature and a pressure within the apparatus to fall within a respective one of a desired flow rate and direction, a desired temperature, and a desired pressure; introducing aluminum metal into the pressure vessel; reducing the concentration of unwanted reactive materials in the pressure vessel; introducing into the pressure vessel at least a substance capable of attaining a supercritical fluid state; introducing a source of hydrogen into the pressure vessel; raising at least one of the temperature and the pressure within the pressure vessel to attain a supercritical fluid state, and reacting the aluminum with the source of hydrogen to produce alane.

In one embodiment, the method further comprises the step of introducing a solvent into the pressure vessel. In some embodiments, the aluminum metal contains (or is doped with) a dopant (such as titanium). In some embodiments, the step of reducing the concentration of unwanted reactive materials in the pressure vessel is performed using an inert gas. In some embodiments, the substance capable of attaining a supercritical fluid state is $CO_2$. In some embodiments, the source of hydrogen is hydrogen gas. In some embodiments, the solvent is an ether such as $Me_2O$, $Et_2O$, or tetrahydrofuran. In another embodiment, the method further comprises the steps of providing a molecule configured to form an adduct with alane; and after completion of the step of and reacting the aluminum with the source of hydrogen to produce alane, removing the molecule configured to form an adduct. The resulting product is substantially pure alane. In some embodiments, the controller configured to control at least one of a fluid flow, a temperature and a pressure within the apparatus is a general purpose programmable computer-based controller. In one embodiment, the temperature is a temperature below 100° C.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
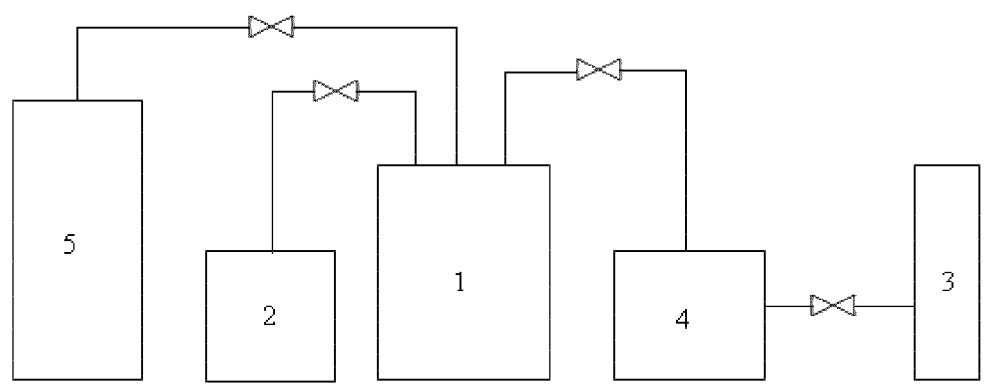
FIG. 1 is a schematic diagram of an apparatus useful to carry out a reaction to generate alane, according to the invention.

The present invention relates to the use of supercritical fluids (SCFs) as a medium to effect the hydrogenation of aluminum, thereby forming alane. Over the past decade, SCFs have developed from laboratory curiosities to occupy an important role in synthetic chemistry and industry. SCFs combine the most desirable properties of a liquid with those of a gas: these include the ability to dissolve solids and total miscibility with permanent gases. For example, supercritical (sc) $CO_2$ has found a wide range of applications in homogeneous catalysis, including such processes as hydrogenation, hydroformylation and olefin metathesis. Heterogeneous catalyses carried out in sc$CO_2$ includes Fischer-Tropsch synthesis and hydrogenation. Furthermore, s$CH_2O$ has also found wide utility in enhancing organic reactions.

Alane is a very attractive system for hydrogen storage, being a simple binary hydride containing 10.1 wt % hydrogen with a theoretical H density of 148 g/L, and possessing a higher volumetric hydrogen capacity than liquid hydrogen. The material is marginally stable at room temperature, releasing $H_2$ between 60 and 140° C. Aluminum is cheap, safe and plentiful and is widely used in $21^{st}$ Century technologies. Alane thus clearly satisfies four of the five DOE criteria. According to the understanding prior to this invention, the major drawback is its lack of reversibility: direct combination of Al and $H_2$ requires draconian pressures—in excess of 25 kbar. The thermodynamic properties of $AlH_3$ vitiate conventional gas-solid synthesis: $AlH_3$ is thermochemically on the cusp with respect to decomposition to Al and $H_2$ (the α-, β- and γ-phases of $AlH_3$ have $\Delta H_{dehyd}$ values of ca. +6, −4 and +1 kJ mol$^{-1}$, respectively). Thus, even at very high pressures of $H_2$, the modest thermal input needed to overcome the activation barrier will place the system thermodynamically in favor of the elements (i.e. to the left of Eq. 3).

$Al+1.5H_2 \leftrightharpoons AlH_3$          Eq. 3

SCFs have unique properties that allow us to overcome this antagonistic interplay between the kinetic and thermodynamic properties of the system. The total miscibility of $H_2$ with a SCF is a distinct advantage in this respect, allowing effective concentrations of hydrogen equivalent to hundreds of bar to be attained easily and efficiently, and favoring the thermodynamics of $AlH_3$ over the elements. In addition, conventional solvents may be added to the SCF medium to enhance the solubility of reactants and/or products, allowing one to alter the kinetic and/or thermodynamic profile of the reaction (q.v.). This is particularly important for a system like $AlH_3$ that is thermally fragile. Furthermore, the high diffusivity of permanent gases in SCF media encourages favorable kinetics to be established close to room temperature.

Examples of supercritical fluid systems and reaction conditions that can be used to produce alane by direct hydrogenation of aluminum include, but are not limited to: $CO_2$ (75 bar), $H_2$ (30-50 bar) 50-60° C., 2-4 h; dimethyl ether (8 bar), $H_2$ (30-40 bar), 125° C., 2-4 h; ethane (65 bar), $H_2$ (30-40 bar), 90° C., 2-4 h; and ternary mixtures of $Me_2O$, $CO_2$ and $H_2$.

Preparative Example

FIG. 1 is a schematic diagram of the apparatus used to regenerate alane from a dehydrogenated sample of the material. In FIG. 1, there is shown a high pressure reaction vessel 1, which is in fluid communication by way of piping and valves with a $Me_2O$ cylinder 2, a $CO_2$ cylinder 3, a $CO_2$ pump 4 and a $H_2$ cylinder 5. Customary symbols for valves are shown in the lines connecting the various components of the apparatus.

A sample of alane prepared by conventional methods was doped with $TiCl_3$ (2 mol %) in order to facilitate $H_2$ evolution and absorption, then the material was dehydrogenated, giving a light gray powder. A powder X-ray diffraction pattern of the resulting material showed only peaks arising from Al. The material was then introduced into a 100 mL stainless-steel pressure reactor 1 under a blanket of inert gas. Examples of inert gases that are suitable for use in the systems and methods of the invention include helium, argon and nitrogen. Nitrogen having negligible oxygen content can be obtained as the boil-off gas from liquid nitrogen, or by gettering nitrogen over metal shavings heated to elevated temperatures (e.g., iron heated to 800° C.). See for example, J. B. Milstein and L. F. Saunders, "Gettering of Gases for High Purity Applications," J. Crystal Growth 89, 124 (1988). A small amount of $Me_2O$ was admitted from tank 2 to vessel 1 as a vapor (50 psi) under its own head pressure. Liquid $CO_2$ (890 psi) was next admitted to vessel 1 from tank 3 with the aid of pump 4, and finally $H_2$, (500 psi was added from tank 5 to vessel 1. The reaction mixture in 1 was then heated to 60° C., thereby forcing the $CO_2/H_2$ mixture into a supercritical phase, and the contents were stirred at 150 rpm for 1 h. Preferably, a temperature below 100° C. is employed. Suitable stirring apparatus can include any of a mechanical stirrer and a magnetic stirrer. At this point, vessel 1 was cooled to room temperature and all volatile material was removed by venting and pumping, for 1 h. Reaction vessel 1 was then disconnected from the other components in FIG. 1, transported into an inert atmosphere glove box, and opened. revealing a gray powder, albeit slightly different in color and appearance to the starting material.

In FIG. 1 features such as heating and cooling apparatus, vents to allow components or reagents to be removed from the system and controllers to operate the heating apparatus, the cooling apparatus and the valves are not shown. Conventional pressure sensing equipment that provides an electrical signal indicative of a pressure can be used to sense and to control pressures in the various portions of the equipment. Electrically or pneumatically operated valves can be used to control the timing and the flow rates as gases and fluids are moved from one container to another, or are held in a container, or are vented. Conventional electrical heaters and conventional fluid based (e.g., water) thermal exchange systems can be used to heat and cool the reaction vessel to the moderate temperatures required. Conventional thermal controllers, using sensors such as thermocouples, and feedback circuits that sense temperature and compare the temperature to a set point can be employed. In some embodiments, conventional general purpose programmable computers can be used to implement the control functions for thermal control and for pumping, mass flow, and pressure control.

In some cases, a person is permitted to control the valves and the operation of the apparatus. It is anticipated that higher yields of alane may be obtained. In particular, several factors could cause a reduction of the amount of alane measured as compared to the amount of alane produced in the process. First, the pressure of the system has to be reduced to remove the alane, thereby reducing the partial pressure of hydrogen available for equilibrium with the product, which might permit the product to decompose to some unknown extent. In addition, the specimen to be examined is removed from the vessel 1, and may be exposed to both oxygen and water vapor in the air ambient that is present during the analysis, even though the specimen is intended to be protected from reactive environments during the analysis.

Figure 2:
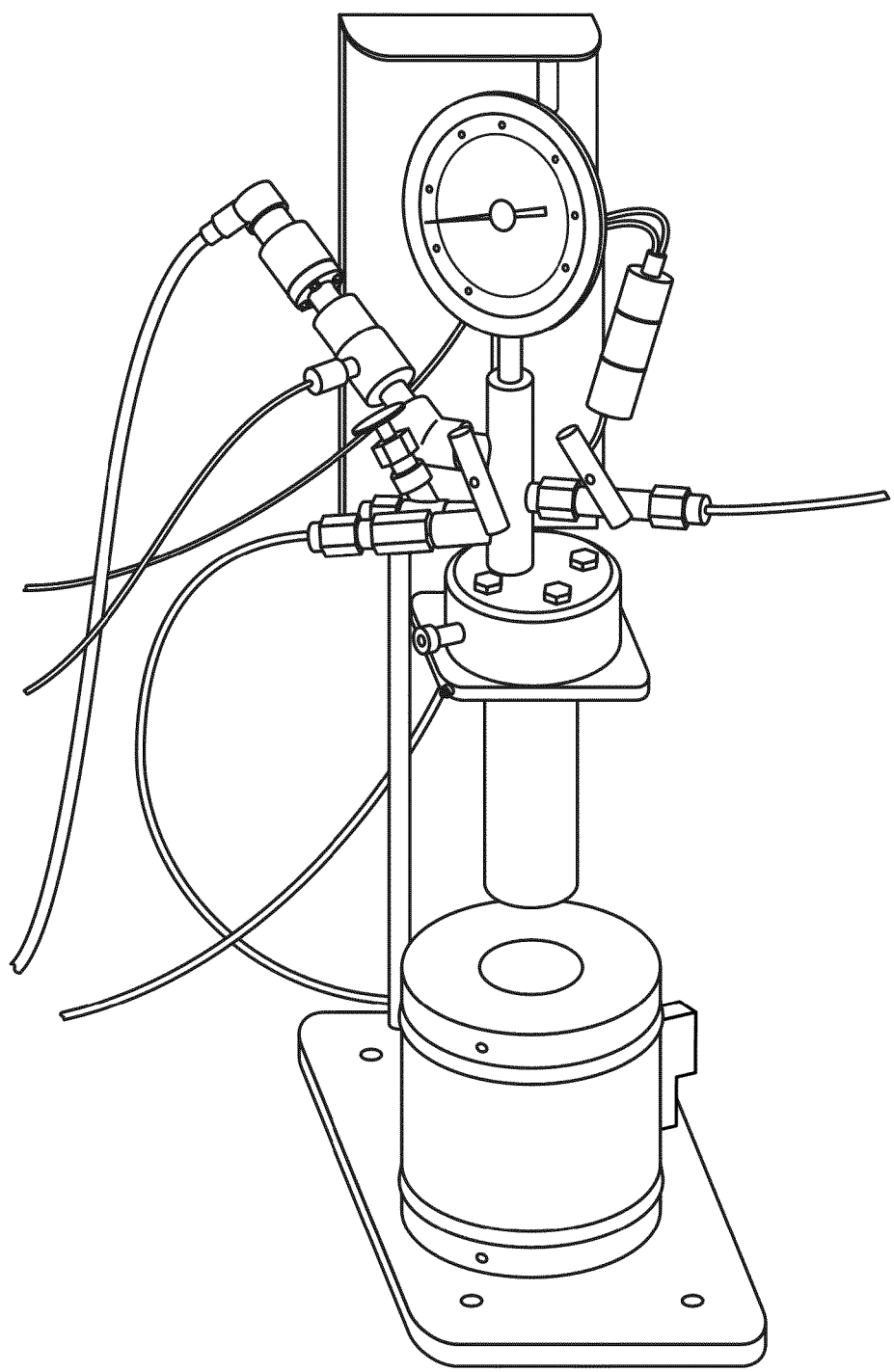
FIG. 2 is an image of a commercially available reactor for carrying out reactions using supercritical fluids.

FIG. 2 is an image of a commercially available reactor for carrying out reactions using supercritical fluids. This reactor, and similar high pressure, compact laboratory reactors, are available from Parr Instrument Company, 211 Fifty Third Street, Moline, Ill. 61265-9984, or from several other sources. These reactors can be obtained with controllers that are used to monitor, control, datalog and archive various parameters, including temperature control, stirring speed control, monitor pressure, log data, control gas and liquid feeds and handle the product produced. In some instances a PC user interface is used to control one or more reactors.

Figure 3:
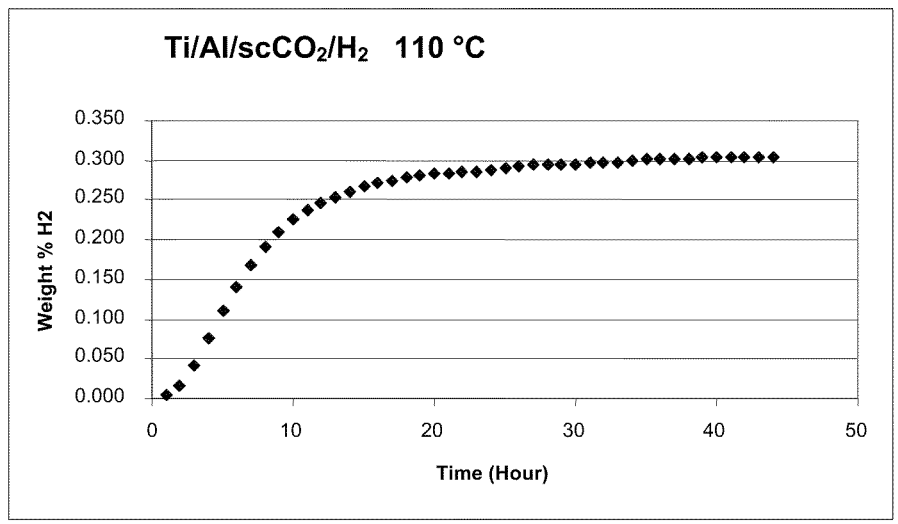
FIGS. 3 and 4 are pressure-composition-temperature (PCT) graphs that illustrate the progress of a dehydrogenation process for a specimen of aluminum with titanium hydrogenated under conditions similar to those described hereinbelow.
Figure 4:
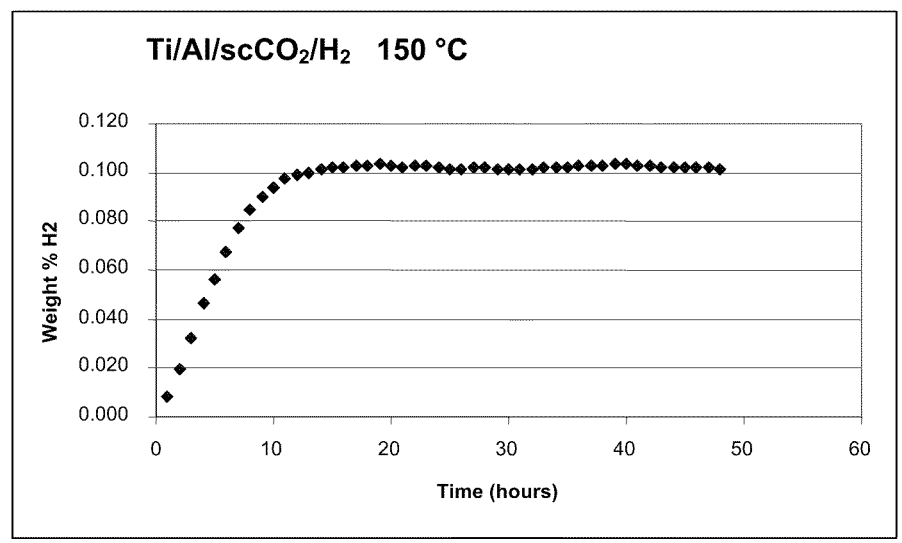

FIGS. 3 and 4 are pressure-composition-temperature (PCT) graphs that illustrate the progress of a dehydrogenation process for a specimen of aluminum with titanium hydrogenated under conditions similar to those described with respect to FIG. 1.

Figure 5:
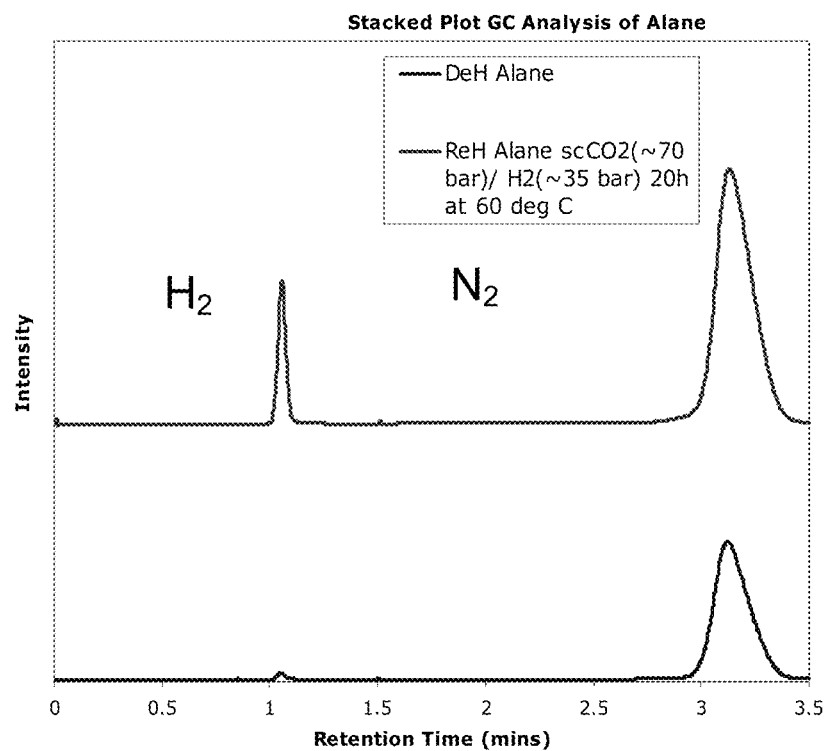
FIG. 5 is a gas chromatograph (GC) plot that illustrates the release of hydrogen from a sample of aluminum with titanium hydrogenated under conditions similar to those described hereinbelow, in which the lower curve represents a control plot of the nitrogen carrier gas, and the upper curve represents the gas desorbed by heating the hydrogenated sample of aluminum with titanium in the presence of the nitrogen carrier gas.

FIG. 5 is a gas chromatograph (GC) plot that illustrates the release of hydrogen from a sample of aluminum with titanium hydrogenated using $scCO_2$ (~70 bar)/$H_2$ (~35 bar), for 20 hours at a temperature of 60° C., in which the lower curve represents a control plot of the nitrogen carrier gas, and the upper curve represents the gas desorbed by heating the hydrogenated sample of aluminum with titanium in the presence of the nitrogen carrier gas.

Alternative Synthesis Method

In a second method we expect that a doped supercritical $CO_2$ reaction medium can be used to prepare alane. We also expect that one can use a completely different supercritical fluid, to create a better thermodynamic environment.

It is expected that one can form an intermediate molecular alane adduct, $L.AlH_3$, whose enthalpy of complex formation ($\Delta Hc$) is more favorable than that of naked $AlH_3$, and which can then be heated to temperatures close to ambient to remove the donor L and produce the desired polymeric $(AlH_3)_x$ material. We believe that the likelihood of this procedure working is high, as a similar two-stage process is employed to stabilize alane and then decomplex it in the so-called 'organometallic route' that is currently the only method of making the material. It is expected that the donor molecule L, can be any one of a range of materials including ethers (such as $Me_2O$ and $Et_2O$) and amines (such as $Me_3N$ and $Et_3N$). We expect that either or both of the 1:1 and 2:1 $L.AlH_3$ complexes may serve as useful stabilized intermediates in the formation of alane. We expect that the addition of molecular hydrogen transfer catalysts (e.g. Wilkinson's catalyst) to the SCF reaction mixture may also be effective, in addition to the solid-state catalysts (e.g. Ti) incorporated in the Al substrate.

As we have already explained, the marginal thermodynamic stability of alane has thwarted its direct preparation from Al and $H_2$ according to the reaction shown in Eq. 3 given above, except under conditions of extreme temperature and pressure. We expect that the use of alternative SCF media and mixtures with donor solvent or co-solvent capability, along with the use of hydrogen transfer catalysts, will allow the stabilizing of a molecular adduct of $nL \cdot AlH_3$ intermediate (with n=1 or n=2), while subsequent removal of the donor L and transformation to the polymeric binary hydride (Eqs. 4 and 5). It has already been demonstrated that triethylenediamine (TEDA) can stabilize $AlH_3$ sufficiently to permit direct reaction between Al and $H_2$ in conventional hydrocarbon solvents to form polymeric $AlH_3 \cdot TEDA$. However, the strongly-bound TEDA ligand is not removable from the $AlH_3$ in this product, therefore rendering the adduct ineffective for preparation of pure alane. See "The Direct Synthesis of Amine Alanes." E. C. Ashby, Journal of the American Chemical Society, 1964, vol. 86, p. 1882. See also "The Direct and Reversible Synthesis of the $AlH_3$ Adduct of Triethylenediamine (TEDA) Starting with Activated Al and Hydrogen," James Joseph Reilly, Jason Graetz, James Wegryzn, Yusuf Celibi, John Johnson and Wei-Min Zhou, MRS Fall Meeting, Boston, 2007.

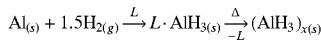

Eq. 4

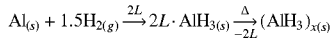

Eq. 5

Examples of adducts that can be prepared (or that are believed to be capable of being prepared) include adducts using molecular oxygen donor ligands such as dimethyl ether ($Me_2O$), diethyl ether ($Et_2O$), dioxane, ethylmethyl ether (MeOEt), tetrahydrofuuran (THF), and molecular nitrogen donor ligands such as pyridine, quinuclidine, trimethylamine ($Me_3N$), triethylamine ($Et_3N$), and triethylenediamine (TEDA). Representative DFT-calculated energies of complex formation ($\Delta Hc$) are given in Table I for oxygen donor ligands, and in Table II for nitrogen donor ligands, for the gas phase reactions described in Eqs. 6 and 7.

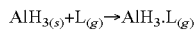

Eq. 6

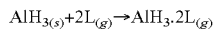

Eq. 7

FIGS. 6 through 9 are diagrams of illustrative conceptual diagrams of various one- and two-ligand adducts taken from the contents of Tables I and II.

TABLE I

| 1:1 Complexes | ΔHc (kJ/mol) | 1:2 Complexes | ΔHc (kJ/mol) |
|---|---|---|---|
| $AlH_3 \cdot Et_2O$ | −71.52 | $AlH_3 \cdot 2Et_2O$ | ? |
| $AlH_3 \cdot MeOEt$ | −77.68 | $AlH_3 \cdot 2MeOEt$ | −99.29 |
| $AlH_3 \cdot Me_2O$ | −83.18 | $AlH_3 \cdot 2Me_2O$ | −113.69 |
| $AlH_3 \cdot Dioxane$ | −84.41 | $AlH_3 \cdot 2Dioxane$ | −116.88 |
| $AlH_3 \cdot THF$ | −93.13 | $AlH_3 \cdot 2THF$ | −122.02 |

Figure 6:
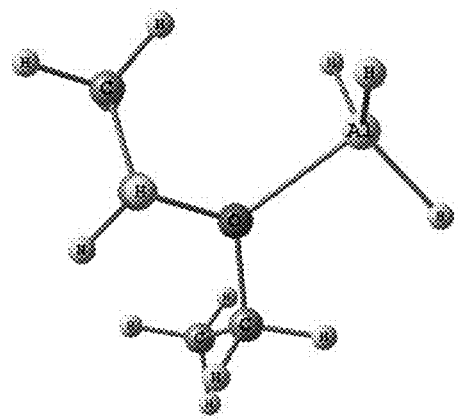
FIG. 6 is an illustrative conceptual diagram of the 1:1 oxygen donor ligand adduct $AlH_3.Et_2O$.

FIG. 6 is an illustrative conceptual diagram of the 1:1 oxygen donor ligand adduct $AlH_3 \cdot Et_2O$.

Figure 7:
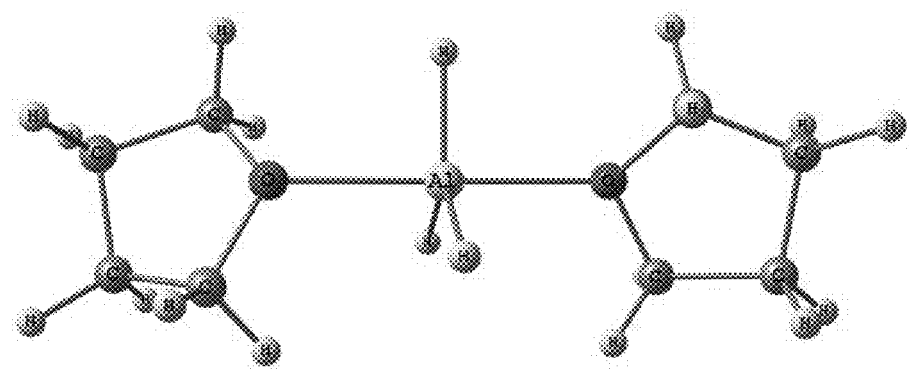
FIG. 7 is an illustrative conceptual diagram of the 1:2 oxygen donor ligand adduct $AlH_3.2THF$.

FIG. 7 is an illustrative conceptual diagram of the 1:2 oxygen donor ligand adduct $AlH_3 \cdot THF$.

TABLE II

| 1:1 Complexes | ΔHc (kJ/mol) | 1:2 Complexes | ΔHc (kJ/mol) |
|---|---|---|---|
| $AlH_3 \cdot Et_3N$ | −89.02 | $AlH_3 \cdot 2Et_3N$ | ? |
| $AlH_3 \cdot Me_3N$ | −108.15 | $AlH_3 \cdot 2Me_3N$ | −145.80 |
| $AlH_3 \cdot pyridine$ | −109.24 | $AlH_3 \cdot 2Pyridine$ | −142.12 |
| $AlH_3 \cdot TEDA$ | ? | $AlH_3 \cdot 2TEDA$ | −155.56 |
| $AlH_3 \cdot Quinuclidine$ | −118.45 | $AlH_3 \cdot 2Quinuclidine$ | −156.24 |

Figure 8:
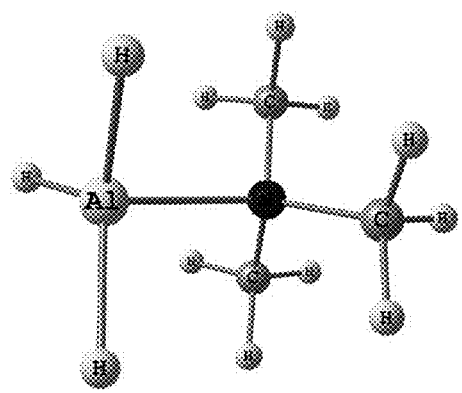
FIG. 8 is an illustrative conceptual diagram of the 1:1 nitrogen donor ligand adduct $AlH_3.Me_3N$.

FIG. 8 is an illustrative conceptual diagram of the 1:1 nitrogen donor ligand adduct $AlH_3 \cdot Me_3N$.

Figure 9:
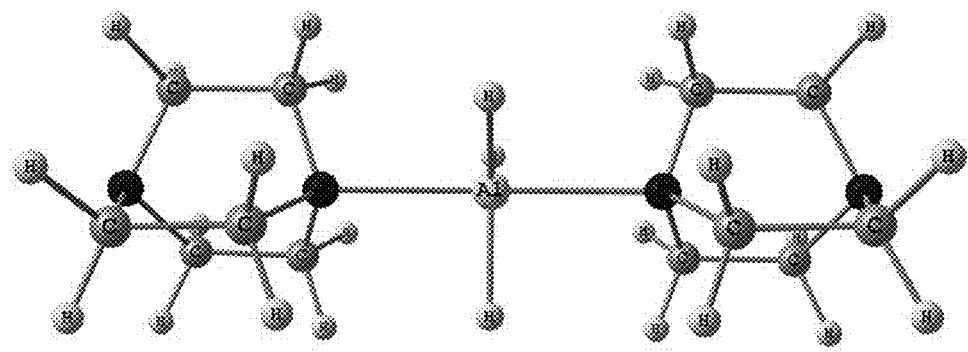
FIG. 9 is an illustrative conceptual diagram of the 1:2 nitrogen donor ligand adduct $AlH_3.2TEDA$.

FIG. 9 is an illustrative conceptual diagram of the 1:2 nitrogen donor ligand adduct $AlH_3 \cdot 2TEDA$.

Various uses for alane material can be suggested, including hydrogen storage, provision of hydrogen recovered from alane, and use of alane fuses in solid fuels for booster rockets.

General Purpose Programmable Computers

General purpose programmable computers useful for controlling instrumentation, recording signals and analyzing signals or data according to the present description can be any of a personal computer (PC), a microprocessor based computer, a portable computer, or other type of processing device. The general purpose programmable computer typically comprises a central processing unit, a storage or memory unit that can record and read information and programs using machine-readable storage media, a communication terminal such as a wired communication device or a wireless communication device, an output device such as a display terminal, and an input device such as a keyboard. The display terminal can be a touch screen display, in which case it can function as both a display device and an input device. Different and/or additional input devices can be present such as a pointing device, such as a mouse or a joystick, and different or additional output devices can be present such as an enunciator, for example a speaker, a second display, or a printer. The computer can run any one of a variety of operating systems, such as for example, any one of several versions of Windows, or of MacOS, or of Unix, or of Linux.

In operation, a general purpose programmable computer is programmed with instructions in the form of software or firmware. The instructions control the operation of the general purpose programmable computer/The general purpose programmable computer can perform a variety of manipulations of data, such as mathematical operations (e.g., calculations), logical operations (e.g., comparisons, or logical deductions following defined rules), and processing of textual or graphical data (e.g., word processing, or image processing). Data can be provided to the general purpose programmable computer as recorded data or as real-time data. The result of any computation or processing operation is recorded in a machine-readable medium or memory for immediate use or for future use. For example, in micro-processor based analysis modules, data can be recorded in a register in a microprocessor, in a cache memory in the microprocessor, in local memory such as semiconductor memory (e.g., SRAM, DRAM, ROM, EPROM), magnetic memory (e.g., floppy disc or hard disc) and/or optical memory (e.g., CD-ROM, DVD, HD-DVD), or in a remote memory such as a central database. Future use of data recorded in a machine-readable medium can include displaying, printing, or otherwise communicating the data to a user, using the data in a further calculation or manipulation, or communicating the data to another computer or computer-based device.

Machine-readable storage media that can be used in the invention include electronic, magnetic and/or optical storage media, such as magnetic floppy disks and hard disks; a DVD drive, a CD drive that in some embodiments can employ DVD disks, any of CD-ROM disks (i.e., read-only optical storage disks), CD-R disks (i.e., write-once, read-many optical storage disks), and CD-RW disks (i.e., rewriteable optical storage disks); and electronic storage media, such as RAM, ROM, EPROM, Compact Flash cards, PCMCIA cards, or alternatively SD or SDIO memory; and the electronic components (e.g., floppy disk drive, DVD drive, CD/CD-R/CD-RW drive, or Compact Flash/PCMCIA/SD adapter) that accommodate and read from and/or write to the storage media. As is known to those of skill in the machine-readable storage media arts, new media and formats for data storage are continually being devised, and any convenient, commercially available storage medium and corresponding read/write device that may become available in the future is likely to be appropriate for use, especially if it provides any of a greater storage capacity, a higher access speed, a smaller size, and a lower cost per bit of stored information. Well known older machine-readable media are also available for use under certain conditions, such as punched paper tape or cards, magnetic recording on tape or wire, optical or magnetic reading of printed characters (e.g., OCR and magnetically encoded symbols) and machine-readable symbols such as one and two dimensional bar codes.

While the present invention has been particularly shown and described with reference to the structure and methods disclosed herein and as illustrated in the drawings, it is not confined to the details set forth and this invention is intended to cover any modifications and changes as may come within the scope and spirit of the following claims.

What is claimed is:

1. A method of generating alane, comprising the steps of:
providing a pressure vessel;
providing a controller configured to control at least one of a fluid flow, a temperature and a pressure within the apparatus to fall within a respective one of a desired flow rate and direction, a desired temperature, and a desired pressure;
introducing aluminum metal into the pressure vessel;
reducing the concentration of unwanted reactive materials in the pressure vessel;
introducing into the pressure vessel a fluid capable of attaining a supercritical fluid state;
introducing a source of hydrogen into the pressure vessel;
raising at least one of the temperature and the pressure within the pressure vessel to attain a supercritical fluid state;
and reacting the aluminum with the source of hydrogen to produce alane.

2. The method according to claim 1, further comprising the step of introducing a solvent or co-solvent into the pressure vessel.

3. The method according to claim 2, wherein said solvent is an ether.

4. The method according to claim 3, wherein said ether is a selected one of $Me_2O$, $Et_2O$, and tetrahydrofuran.

5. The method according to claim 1, wherein said step of reducing the concentration of unwanted reactive materials in the pressure vessel is performed using an inert gas.

6. The method according to claim 5, wherein said inert gas is a selected one of helium and argon.

7. The method according to claim 5, wherein said inert gas is nitrogen.

8. The method according to claim 1, wherein said fluid capable of attaining a supercritical fluid state is $CO_2$.

9. The method according to claim 1, wherein said source of hydrogen is hydrogen gas.

10. The method of claim 1, wherein said controller configured to control at least one of a fluid flow, a temperature and a pressure within the apparatus is a general purpose programmable computer-based controller.

11. The method of claim 1, wherein said temperature is a temperature below 100° C.

* * * * *